(12) United States Patent
Scheuer et al.

(10) Patent No.: US 6,885,794 B2
(45) Date of Patent: Apr. 26, 2005

(54) MICRO-RING RESONATOR

(75) Inventors: Jacob Scheuer, Petach Tikva (IL);
Yoav Yadin, Haifa (IL); Moti Margalit, Zichron Yaaqov (IL)

(73) Assignee: Lambda Crossing, Ltd., Caesarea (IL)

( * ) Notice: Subject to any disclaimer, the term of this patent is extended or adjusted under 35 U.S.C. 154(b) by 296 days.

(21) Appl. No.: 10/193,700

(22) Filed: Jul. 11, 2002

(65) Prior Publication Data

US 2004/0008942 A1 Jan. 15, 2004

(51) Int. Cl.⁷ .................................................. G02B 6/26
(52) U.S. Cl. .............................. 385/39; 385/32; 385/50; 372/92; 372/94
(58) Field of Search .............................. 385/24, 31–32, 385/39, 43; 372/92–94

(56) References Cited

U.S. PATENT DOCUMENTS

| | | | |
|---|---|---|---|
| 5,349,601 A | | 9/1994 | Hohimer et al. |
| 5,764,681 A | * | 6/1998 | Ballantyne et al. ........... 372/94 |
| 5,998,781 A | | 12/1999 | Vawter et al. |
| 2002/0030822 A1 | | 3/2002 | Mizutani |
| 2004/0040646 A1 | * | 3/2004 | Takahashi et al. .......... 156/230 |

FOREIGN PATENT DOCUMENTS

| | | |
|---|---|---|
| EP | 1022543 A1 | 7/2000 |
| JP | 7139954 | 6/1995 |
| WO | 0072065 | 11/2000 |
| WO | 0122139 | 3/2001 |
| WO | WO 01-22139 A1 | 3/2001 |
| WO | 0127692 | 4/2001 |

OTHER PUBLICATIONS

Patent Abstracts of Japan of JP 7–139954 Dated Jun. 2, 1995.
Int'l Search Report Feb. 23, 2004 Scheuer.
Little, B.E, et al "Vertically Coupled Glass Microring Resonator Channel Dropping Filters" IEEE Photonics Technology Letters, vol. 11, No. 2, p. 215–217, (1999).

* cited by examiner

*Primary Examiner*—Brian Healy
*Assistant Examiner*—Eric Wong
(74) *Attorney, Agent, or Firm*—Simon Kahn

(57) ABSTRACT

A resonator structure is presented comprising a closed loop resonator waveguide having a width varying over the circumferential region of the resonator waveguide. The resonator structure can be used in various applications, such as optical filters, lasers, modulators, spectrum analyzers, wavelockers, interleave filters, and optical add drop multiplexers.

21 Claims, 4 Drawing Sheets

MICRO-RING RESONATOR

FIELD OF THE INVENTION

This invention relates to resonant optical cavities and more particularly to ring-like cavities used in integrated optical devices.

BACKGROUND OF THE INVENTION

An optical resonator is an important element, which can be incorporated into many of the components used for optical communication systems such as lasers, filters, routers, switches, etc. Such resonator can be easily realized in integrated optical devices with linear waveguides to form a Planar Lightwave Circuit (PLC). One of the most common roles of the optical resonator is to serve as a wavelength dependent coupler between two (or more) waveguides (input/output (I/O) waveguides). This is schematically illustrated in FIGS. 1A and 1B, wherein an oval-like or circular resonator serves for coupling between two linear waveguides. The light couples from one (input) linear waveguide into the resonator waveguide and from the resonator to the other (output) linear waveguide. In specific wavelengths, known as the resonance wavelengths of the resonator structure, all the light is eventually transferred from the first linear waveguide to the second linear waveguide. The resonator is typically characterized by following parameters:

Free spectral, range (FSR);
Loss per revolution;
Coupling to the waveguides;
Q factor, which can be derived from the three parameters defined above.

Two primary implementation types of micro-ring resonators in planar technology are known in the art:

1. Single layer implementation—both I/O waveguides and the resonator are located in the same layer (horizontal coupling as shown in FIGS. 1A and 1B). This is disclosed for example in WO 01/22139 and WO 00/72065;
2. Double layer implementation—the I/O waveguides and the resonator are located in different layers (vertical coupling—as shown in FIG. 1C). This approach is disclosed in the following publication: B. E. Little et al., "*Vertically coupled glass microring resonator channel dropping filters*", IEEE Photonics Technology Letters vol. 11 no. 2, February 1999, p. 215–217). Here, $n_g$ is the refractive index of a substrate, $n_g$, $w_g$ and $h_g$ are the refractive index, width and height of the input/output waveguides, $n_r$, $w_r$ and $h_r$ are the refractive index, width and height, respectively, of the ring, and $n_0$ is the refractive index of a cladding layer.

Both implementations have advantages and disadvantages. Because of the vertical coupling mechanism, the double layer implementation may have better coupling and loss characteristics, as compared to those of the single-layer implementation, but requires complex and expensive process capabilities. The single layer implementation, although requiring simpler process, presents a design tradeoff between the resonator parameters (FSR, coupling, loss/rev). Characteristics such as large FSR, low loss and high coupling (more than 3%) are important for a micro-ring resonator, regardless of the specific function it fulfills. However, achieving these characteristics simultaneously is difficult since the demands on the resonator shape contradict.

To achieve low losses, the best resonator shape would be a perfect circular ring with high refractive index contrast to achieve tight mode profiles. However, these characteristics would result in poor coupling due to the tight mode profiles of the waveguides and the resonator, or would require a very small gap, which in turn requires very complex and expensive processes. In order to increase the coupling, the racetrack resonator, which is comprised of two straight waveguides connected with two half rings, was suggested (see FIG. 1A). Although this resonator shape improves the coupling between the I/O waveguide and the resonator, it also increases the losses per revolution (loss/rev) due to the mismatch between the straight waveguide and the circular waveguide modes.

SUMMARY OF THE INVENTION

It is a therefore a need in the art to design a resonator structure that provides for high coupling and low loss/rev.

The performance of a resonator-based device of any kind significantly depends on the resonator loss. There are two primary mechanisms that induce losses in the resonator—material loss and radiation loss. Material loss is an inherent property of the material comprising the resonator, and is an exponential function of the length of the resonator. As for the radiation loss, it arises from the waveguide imperfections such as surface roughness, and from the bend related radiation loss. The surface roughness is similar in effect to the material dependant loss and depends on the waveguide shape and refractive index. The bend related loss also depends on the waveguide shape and refractive index, but also critically depends on the radius of the curvature and abrupt changes in the waveguide mode (intersections of straight and curved waveguides). In order to decrease radiation losses, it is therefore required to design a resonator with large and smooth curvatures. This, however, would result in a very small FSR, and also would increase the overall length of the resonator and losses related to the material and surface roughness. Hence, the current solutions cannot provide a reduction in the resonator loss below a certain value.

The present invention solves the above problems by providing an improved resonator structure comprising a resonator waveguide having an optimized shape and geometry, which permits high coupling efficiency and significantly smaller loss/rev, as compared to the known resonators of the kind specified. The resonator structure according to the invention comprises a closed loop resonator for coupling to at least one waveguide that serves as a light input or output with respect to the resonator waveguide, wherein the resonator waveguide has a varying width across the circumferential region of the resonator. Generally, the closed loop can be of any shape having arc segments connected to each other either directly or through substantially straight segments of the resonator waveguide. Substantially circular resonators are preferred due to their smaller losses, and oval-like resonators are even more preferable since they provide an increased coupling as compared to a perfect circular ring resonator. The term "oval-like resonator" used herein signifies a resonator having a continuous closed loop shape formed by substantially arcuate end segments connected to each other either directly, or via substantially straight side segments extending therebetween (racetrack resonator).

The inventors have found that by providing a region of the closed loop resonator waveguide with varying width across the circumference decreases significantly the radiation losses of the resonator. By making this closed loop resonator with an oval-like shape, any required coupling to the waveguide can be provided without imposing difficult fabrication constraints and gap spacing. It should be understood that the width-varying region can be within the arc segment of the resonator, and can be achieved by making this region with a varying curvature, and/or the width-varying region can be within a substantially straight segment of the resonator waveguide. The closed loop resonator waveguide of the present invention can be used in a variety of applications such as optical filters, lasers, modulators, spectrum analyzers, wavelockers, interleave filters, optical add drop multiplexers and other applications.

There is thus provided according to one aspect of the present invention, a resonator structure comprising a closed loop resonator waveguide having a width varying over a circumferential region thereof.

The resonator waveguide is made of a dielectric material with refractive index n being different from that of a surrounding material.

The resonator structure may include at least one additional waveguide optically coupled to the resonator waveguide and serving as input and output of light of various wavelengths into and out of the resonator waveguide.

Thus, according to another aspect of the present invention, there is provided a resonator structure comprising a closed loop resonator waveguide optically coupled to at least one waveguide, said closed loop resonator waveguide having a width varying over a circumferential region thereof.

Preferably, the resonator waveguide has an oval-like shape, namely, is an optical planar resonator having arc-segments that may be directly connected to each other or may be connected to each other via substantially straight waveguide segments of the resonator. As indicated above, generally, the width variation of the resonator waveguide could be achieved by providing the variation of this parameter within the substantially straight segment(s) of the resonator between the arc segments. However, since this variation is easier to achieve as a smooth passage from one radius of the resonator curvature to another, the width-varying region is preferably within the arc segment of the resonator waveguide.

According to yet another aspect of the present invention, there is provided a resonator structure comprising a closed loop oval-like resonator waveguide having arc-waveguide segments connected to each other, wherein a width of the arc segment vary over the circumference thereof.

The inner and outer boundaries of the arc-waveguides are preferably given by the expression:

$$\left(\frac{x}{a}\right)^n + \left(\frac{y}{b}\right)^n = 1$$

wherein x and y are the coordinates, a and b are the major and minor axes, and n is the order of the High Order Ellipse (HOE), which is preferably larger than 1.5, e.g., is equal to 2.

The shape and geometry of the resonator waveguide are preferably such that the eccentricities of the inner and outer boundaries of the arc waveguide segments are different. Preferably, the eccentricities of the inner and outer boundaries of the arc-waveguides are larger than 1.

Thus, according to yet another aspect of the present invention, there is provided a resonator structure comprising a closed loop oval-like resonator waveguide having arc-waveguide segments connected to each other, wherein inner an outer boundaries of the arc-waveguide segments are given by:

$$\left(\frac{x}{a}\right)^n + \left(\frac{y}{b}\right)^n = 1$$

wherein x and y are the coordinates, a and b are the major and minor axes, and n is the order of the high order ellipse, thereby providing variations of a width of the arc segments over the circumference thereof.

Preferably, the order of HOE is larger than 1.5.

According to yet another aspect of the present invention, there is provided an optical device comprising first and second waveguides, and a resonator waveguide coupled to the first and second waveguides, the resonator waveguide being of an oval-like shape having a width varying over a circumferential region of the resonator waveguide.

The optical device can also comprise a control unit for tuning the resonance frequencies of the resonator waveguide using one of the thermal, electro-optic, mechanical and carrier injection mechanisms.

The resonator structure may include an additional resonator waveguide with a varying width over a circumferential region thereof, the two resonator waveguides being accommodated in a spaced-apart relationship between first and second waveguides (that may be substantially straight) and being optically coupled to the first and second waveguides. Such a structure thus presents an optical resonator structure for storing optical energy, wherein the two spaced-apart resonator waveguides and the sections of the first and second waveguides between the resonators creates a closed loop compound resonator for storing optical energy of a predetermined frequency range. The principal and advantageous features of the closed loop compound resonator are disclosed in WO 01/27692 assigned to the assignee of the present application. By including a gain medium in at least one of the first and second waveguides and/or in at least one of the resonators (e.g., in at least one of the arc-waveguides thereof), the entire resonator structure can operate as a laser device.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A to 1C are schematic illustrations of the state of the art micro-resonator based devices, wherein FIGS. 1A and 1B illustrate a single layer based implementation, and FIG. 1C illustrates a multi-layer based implementation;

DETAILED DESCRIPTION OF THE INVENTION

Figure 1A:
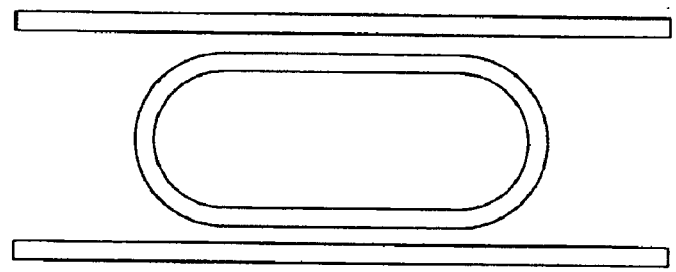
Figure 1B:
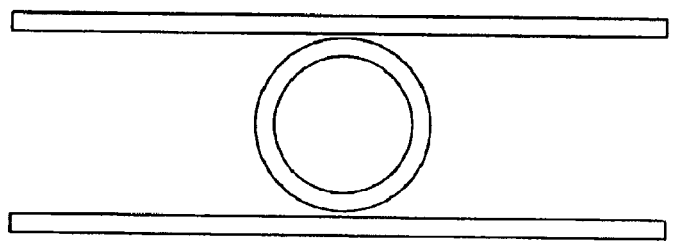
Figure 1C:
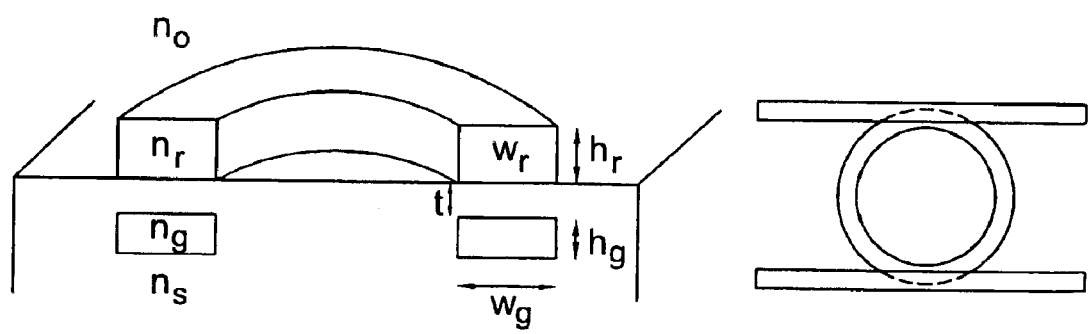

FIGS. 1A–1C illustrate the prior art ring resonator based structure. FIGS. 1A and 1B show structures utilizing, respectively, a race-track ring resonator and a circular resonator (perfect ring), both fabricated according to the single-layer approach, and FIG., 1C shows a structure utilizing circular resonator and the multi-layer approach ["*Vertically coupled glass microring resonator channel dropping filters*", B. E. Little et al., IEEE Photonics Technology Letters vol. 11 no. 2, February 1999, p. 215–217].

Figure 2:
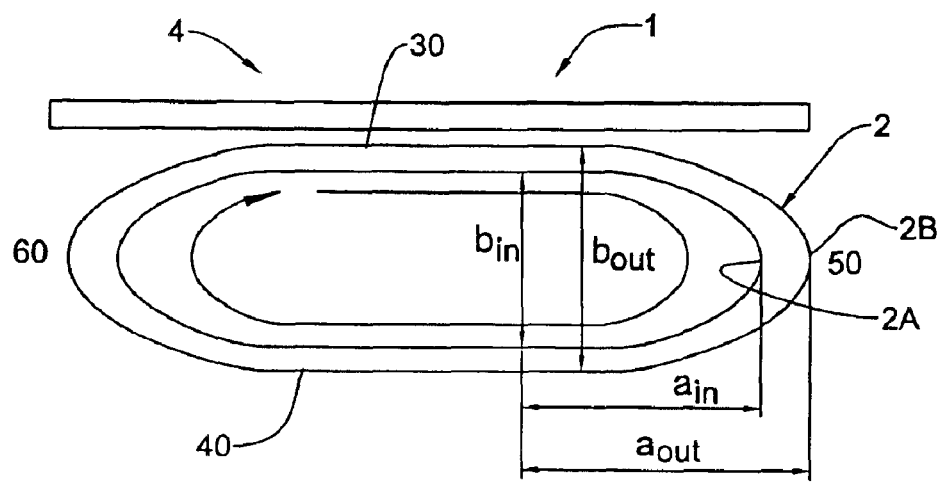
FIG. 2 schematically illustrates a resonator structure according to the invention utilizing a resonator waveguide having an appropriate profile to minimize radiation losses.

Referring to FIG. 2, there is illustrated a novel resonator structure 1 according to the invention. The structure 1 comprises a closed loop, preferably oval, resonator waveguide 2, and a waveguide 4, which provides the input and output to the resonator. Structure 1 can thus operate as the all pass filter device. In the present example, the waveguide 4 is substantially straight (linear waveguide), but it should be understood that it may be a closed loop resonator waveguide or an open bent waveguide. The resonator waveguide 2 is made of a dielectric material with refractive index n different from that of a surrounding material, and has two arc segments 50 and 60 that in the present example are connected to each other by substantially straight waveguide segments 30 and 40 of the resonator. It should however be understood that the arc segments 50 and 60 can be directly connected to each other, the resonator waveguide can be formed by more than two arc segments connected to each other either directly or via substantially straight segments of the resonator waveguide. As shown in the figure, each of the arc segments has a varying width across the circumference thereof. For example, the resonator waveguide 2 may be bound by two ellipses, the inner ellipse 2A with $a_{in}=30$ μm and $b_{in}=20$ μm, and the outer ellipse 2B with $a_{out}=36$ μm and $b_{out}=24$ μm (a and b being the major and minor axes). In this case, the width of the resonator waveguide changes along the resonator between 4 μm and 6 μm, and the resonator curvature radius decreases with the increasing width. It should also be understood that the width-varying region of the resonator wavelength can be formed within the substantially straight segment of the resonator waveguide.

Figure 3:
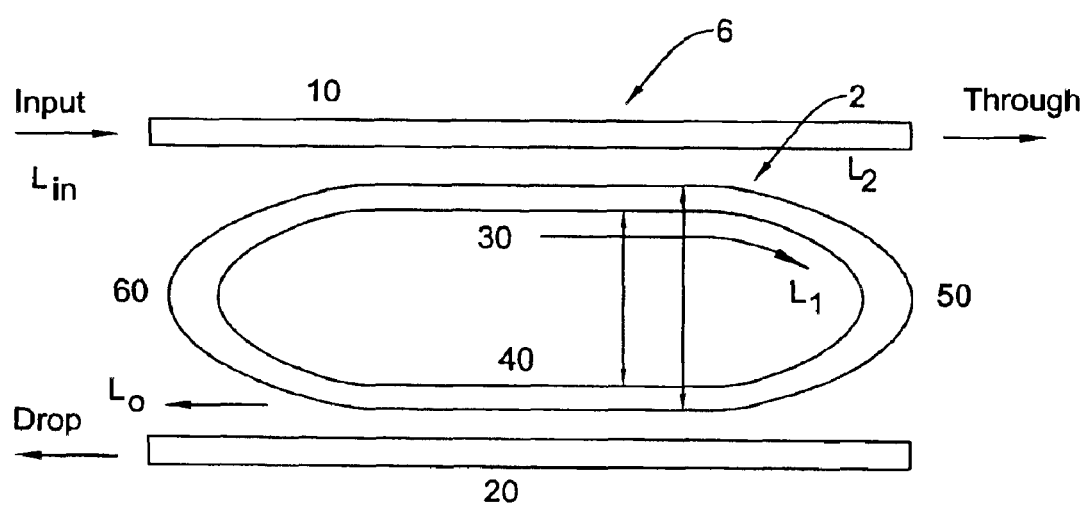
FIG. 3 schematically illustrates an implementation of the optimized resonator structure according to the invention for a channel drop filter (CDF)

FIG. 3 illustrates a channel drop filter (CDF) device 6 implemented utilizing the resonator waveguide of the present invention as a wavelength dependent coupler between input and output waveguides. To facilitate understanding, the same reference numbers are used for identifying the common components in the examples of FIGS. 2 and 3. Thus, in the device 6, straight waveguide segments 30 and 40 of the resonator waveguide 2 are used for coupling light from I/O waveguides 10 and 20, while the oval arc segments 50 and 60 of the resonator waveguide 2 are used for redirecting the light from waveguide segment 30 to waveguide segment 40 and vice versa. Similarly, the arc segments 50 and 60 can be directly connected to each other, not through substantially straight segments 30 and 40. In this implementation, input light $L_{in}$ to be filtered propagates in the input waveguide 10. Part $L_1$ of the input light, whose spectrum is defined by the resonance frequency of the resonator waveguide 2, the coupling between the waveguide 10 and the resonator waveguide segment 30, the coupling between the waveguide 20 and the resonator waveguide segment 40, and the resonator loss, couples into the resonator waveguide 2 through its straight waveguide segment 30 and starts to circulate in the resonator waveguide 2, while the remaining portion $L_2$ of the input light remains in the waveguide 10 and propagates towards a through channel of the device. Part $L_0$ of the circulating part $L_1$ couples out of the resonator waveguide to the output waveguide 20 via the waveguide segment 40 of the resonator 2 and is output at a drop channel of the device. The spectrum of light $L_0$ is also defined by the resonance frequency of the resonator waveguide 2, the coupling between the waveguide 10 and the waveguide segment 30, the coupling between the waveguide 20 and the waveguide segment 40 and the resonator loss. For specific wavelengths, called the resonance wavelengths, ideally all the light of these wavelengths would couple from the input waveguide 10 to the output waveguide 20. The resonator structure of FIG. 3 can operate as an optical filter, modulator, spectrum analyzer, wavelocker, interleave filter, optical add drop multiplexer, etc.

Figure 4:
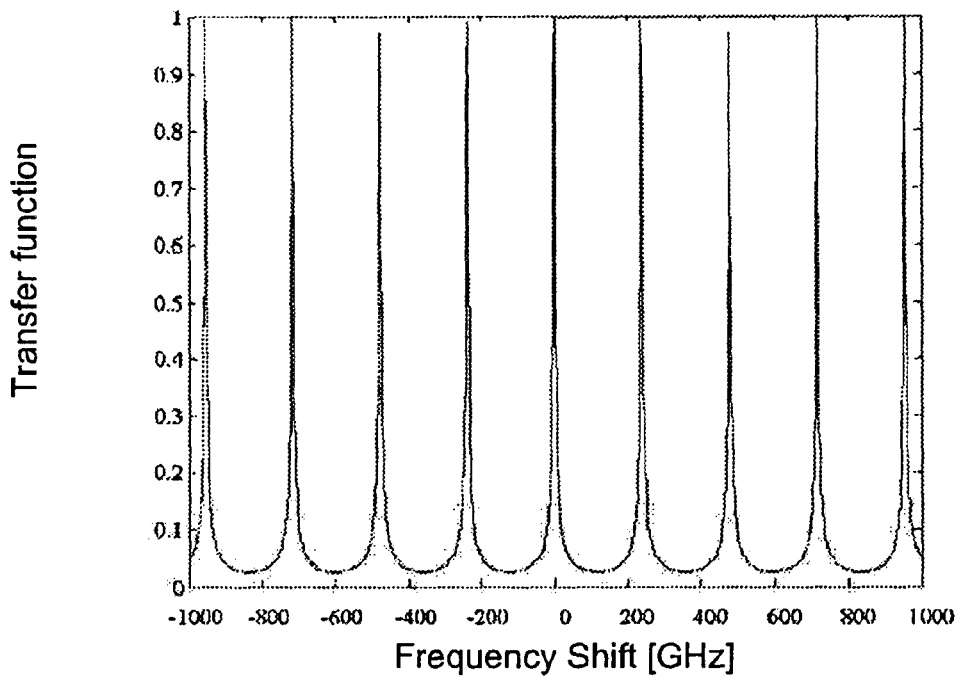
FIG. 4 shows the input and output spectra of a ring-resonator based CDF device.

FIG. 4 shows the transfer function as a function of a frequency shift from the resonance frequency presenting a ratio between the drop output and input spectra of a ring-resonator based channel drop filter. By varying the refractive indices of the waveguides in the structure including the resonator waveguide, the resonance frequencies can be changed, thus enabling the development of turnable devices (such as filters and lasers) based on the tunable resonator. The timing can be achieved by a variety of mechanisms such as heating the resonator (thermo-optic effect), subjecting it to electric field (electro-optic effect), mechanical pressure, free carrier injection change of refractive index, piezo electric effect, etc.

Figure 5:
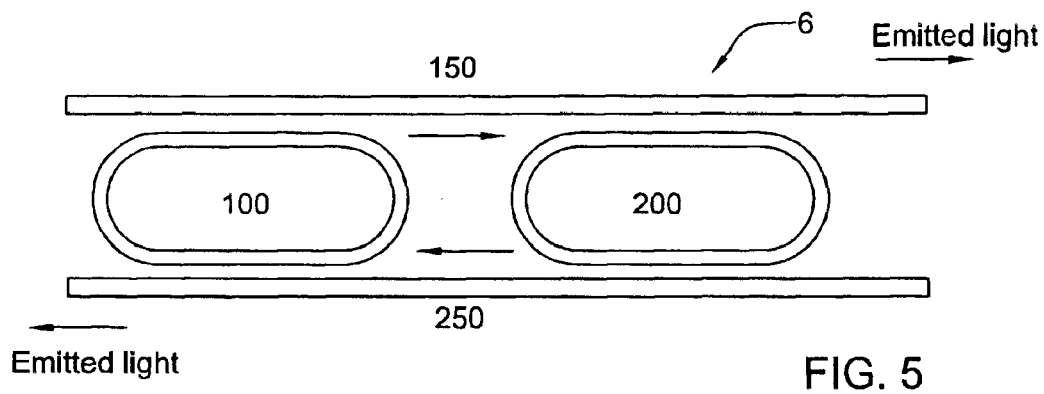
FIG. 5 schematically illustrates an implementation of optimized resonator structure according to the invention in a laser.

FIG. 5 illustrates an implementation of a laser structure 8 using two oval resonator waveguides 100 and 200 according to the invention, and two substantially straight waveguides 150 and 250. In this implementation, at least one of the straight waveguides 150 and 250, or at least one of the resonator waveguides 100 and 200, or all of them, have a gain medium and are pumped electrically or optically in order to enable light amplification. The oval resonators 100 and 200, and the straight waveguides 150 and 250 thus form together a larger resonator which comprises the laser cavity. Light is emitted from both straight waveguides, as shown in the figure.

Figure 6:
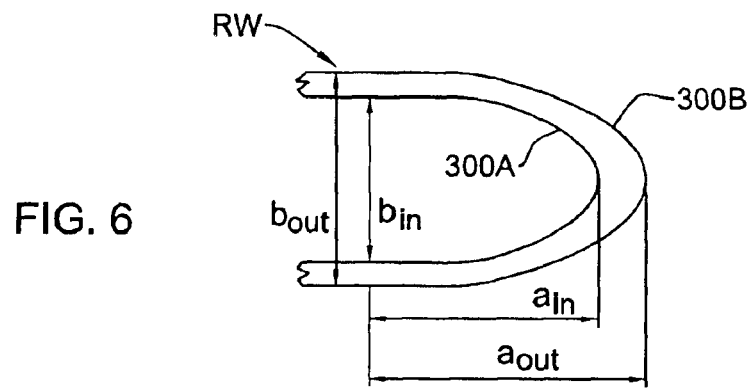
FIG. 6 schematically illustrates a resonator structure according to the invention utilizing a High Order Ellipse (HOE) shaped resonator waveguide.

The present invention provides a resonator loop profile that allows for decreasing the radiation loss of the resonator beyond existing limits, while, of course, maintaining a large FSR. By way of illustration and without lost of generality, FIG. 6 illustrates a part of a resonator waveguide according to one specific example of the resonator design according to the invention providing for significantly reducing the resonator radiation losses. Here, a resonator waveguide RW has the inner and outer boundaries 300A and 300B of an arc waveguide segment profiled as a High Order Ellipse (HOE), obeying the following formula:

$$\left(\frac{x}{a}\right)^n + \left(\frac{y}{b}\right)^n = 1$$

wherein a and b are the major and minor axes of the HOE and n is the HOE order.

The HOE parameters of the inner and outer boundaries of the arc waveguide segment do not have to be identical. For example, the HOE are the ellipse for n=2 and the circle for n=2 and a=b. Preferably, the order n of the HOE is larger than 1.5. The shape and geometry of the resonator waveguide are preferably such that the eccentricities of the inner and outer boundaries of the arc-waveguides are different, and are preferably larger than 1.

It is useful to define the HOE eccentricity as the ratio between the HOE axes:

$$\epsilon = a/b$$

For given application requirements of the ring resonator (for example, a CDF bandpass and FSR), the resonator parameters, the FSR and coupling can be evaluated. The required FSR determines the total perimeter of the resonator waveguide, while the required coupling determines the lengths of the straight waveguide segments (30 and 40 in FIGS. 2 and 3) of the resonator. The length of the arc waveguide segment is, therefore, half the difference between the resonator perimeter and twice the straight waveguide segment length. Keeping the total arc-segment length constant, the arc parameters ($n_{in}$, $\epsilon_{in}$, $a_{in}$, $b_{in}$, $n_{out}$, $\epsilon_{out}$, $a_{out}$, $b_{out}$ where "in" and "out" correspond to the inner and outer arc-segment boundaries) can be optimized in order to reduce the radiation losses of the resonator. For example, the following arc parameters can be used: $n_{in}=2.5$, $\epsilon_{in}=2$, $a_{in}=40$, $b_{in}=20$, $n_{out}=2.5$, $\epsilon_{out}=2.5$, $a_{out}=50$, $b_{out}=20$.

Figure 7:
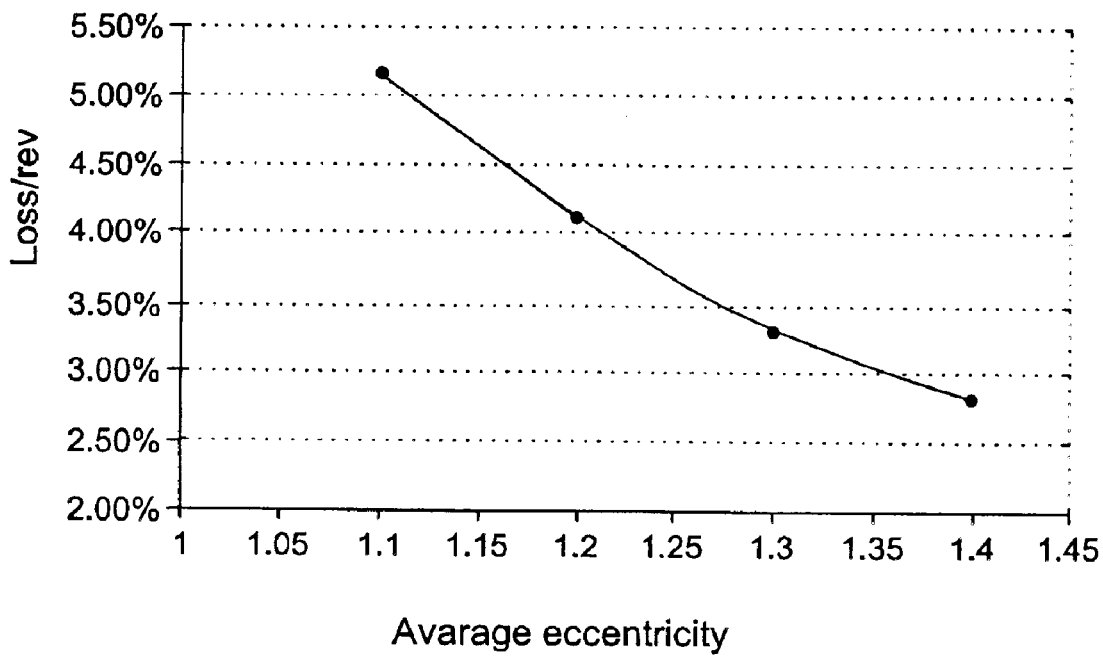
FIG. 7 shows the improvement in the radiation loss for optimized resonators of the present invention.

FIG. 7 shows the loss/rev as a function of average eccentricity, $(\epsilon_{in}+\epsilon_{out})/2$. The graph shows the radiation losses of resonators of order 2 ($n_{in}=n_{out}=2$), with identical FSR and coupling, but with different eccentricities. The graph clearly shows how the resonator losses can be reduced significantly without changing the FSR or coupling, but changing the average eccentricity, and thus causing the resonator width and curvature variations.

Figure 8:
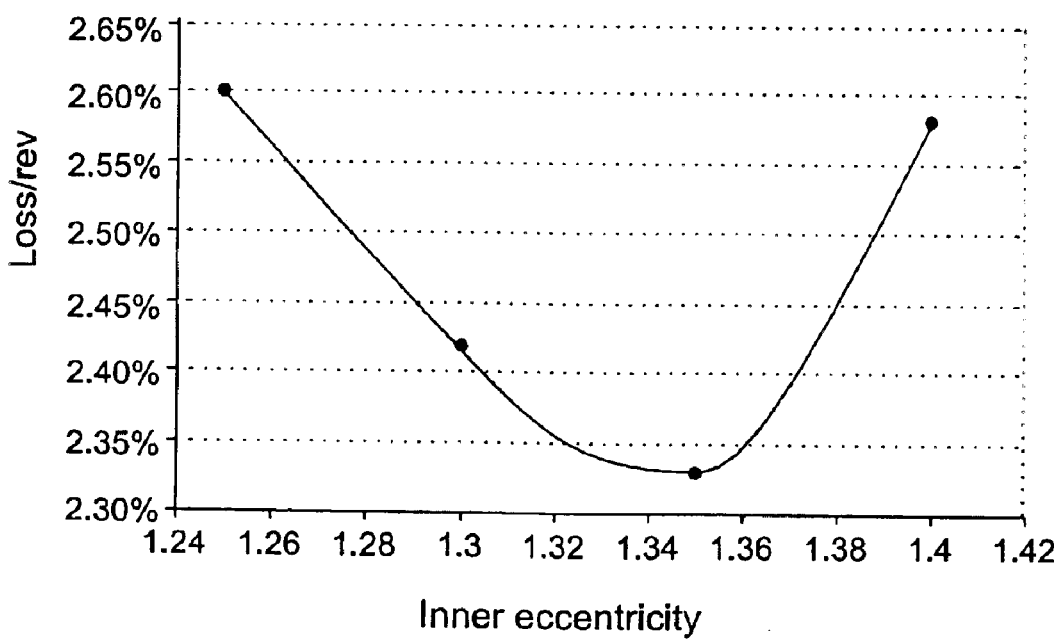
FIG. 8 shows the dependency of the radiation loss on the parameters of the inner boundary of the arc-waveguides.

FIG. 8 shows the dependency of radiation losses on the inner boundary eccentricity $\epsilon_{in}$. The graph shows the radiation losses of resonators of order 2 ($n_{in}=n_{out}=2$), with identical FSR, coupling and outer eccentricity $\epsilon_{out}$, but with different inner eccentricities $\epsilon_{in}$. It is thus evident that variation of the resonator width affects the resonator losses.

Thus, the present invention provides a closed loop resonator with varying curvature and width across the circumference of the resonator. The resonator preferably has the oval-like shape, namely, has two arc-waveguide segments connected to each other either directly or via two substantially straight waveguide segments of the resonator.

Those skilled in the art will readily appreciate that various modifications and changes can be applied to the embodiments of the invention as hereinbefore exemplified without departing from its scope defined in and by the appended claims. For example, the resonator of the invention can be used in a structure including one or two waveguides coupled to the resonator, and can be used in various applications, such as optical filters, lasers, modulators, spectrum analyzers, wavelockers, interleave filters, optical add drop multiplexers and other applications.

What is claimed is:

1. A resonator structure comprising a closed loop resonator waveguide having a width varying over a circumferential region thereof, wherein said closed loop resonator waveguide is of an oval-like shape formed by arc-waveguide segments connected to each other.

2. The structure according to claim 1, wherein the width of the arc segment varies over the circumference thereof.

3. The structure according to claim 1, wherein said arc-waveguide segments are connected to each other via substantially straight waveguide segments of the resonator.

4. The structure according to claim 3, wherein the width of the straight waveguide segment varies over its length.

5. The structure according to claim 2, wherein inner an outer boundaries of said arc-waveguide segments are given by:

$$\left(\frac{x}{a}\right)^n + \left(\frac{y}{b}\right)^n = 1$$

wherein x and y are the coordinates, a and b are the major and minor axes and n is the order of a High Order Ellipse (HOE).

6. The structure according to claim 5, wherein the order of the HOE is higher than 1.5.

7. The structure according to claim 6, wherein the order of the HOE is equal to 2.

8. The structure according to claim 2, wherein the inner and outer boundaries of the arc-waveguide segments have different curvatures.

9. The structure according to claim 2, wherein eccentricities of the inner and outer boundaries of the arc-waveguide segments are larger than 1.

10. The structure according to claim 1, comprising at least one additional waveguide coupled to said resonator waveguide and serving as light input and output to and from the resonator waveguide.

11. The structure according to claim 10, wherein said resonator waveguide is made of a material with a refractive index different from that said at least one waveguide.

12. The structure according to claim 11, wherein said resonator structure is made of a material with a refractive index different from said at least one additional waveguides.

13. The structure according to claim 11, wherein said resonator waveguide has an oval-like shape formed by arc-waveguide segments connected to each other through substantially straight segments of the resonator waveguide, the structure comprising at least one additional waveguide coupled to said resonator waveguide via the substantially straight waveguide segment thereof.

14. The structure according to claim 1, comprising an additional resonator waveguide having a width varying over a circumferential region thereof, and two additional waveguides, the two resonator waveguides being accommodated in a spaced-apart relationship between the two additional waveguides and each of the resonator waveguide being optically coupled to the additional waveguides.

15. The structure according to claim 14, comprising a gain medium inside at least one of the following elements of the structure: at least one of the additional waveguides, and at least one of the resonator waveguides.

16. A resonator structure comprising a closed loop oval-like resonator waveguide having arc-waveguide segments connected to each other, wherein a width of the arc segment varies over the circumference thereof.

17. A resonator structure comprising a closed loop oval-like resonator waveguide formed by two arc-waveguide segments connected to each other, wherein inner an outer boundaries of the arc-waveguide segments are given by:

$$\left(\frac{x}{a}\right)^n + \left(\frac{y}{b}\right)^n = 1$$

wherein x and y are the coordinates, a and b are the major and minor axes, and n is the order of a high order ellipse, thereby providing a width variation of the arc segments over the circumference thereof.

18. An optical device comprising first and second waveguides, and a closed loop resonator waveguide coupled to the first and second waveguides, the resonator waveguide being of an oval-like shape having a width varying over a circumferential region thereof.

19. The device according to claim 18, and comprising a control unit connected to at least one of the first waveguide, second waveguide, and the resonator waveguide, and operable to tune a resonance frequency of the resonator waveguide by at least one of the following effects: thermal, electro-optic, mechanical, and carrier injection.

20. The device according to claim 18, comprising an additional resonator waveguide having a width varying over a circumferential region thereof and optically coupled to said first and second waveguides, the two resonator waveguides being accommodated in a spaced-apart relationship between the first and second waveguides, and a gain medium being provided inside at least one of the following: at least one of the first and second waveguides, and at least one of the resonator waveguides.

21. The structure according to claim 1, wherein the resonator waveguide is made of a dielectric material with refractive index difference n different from that of a surrounding material.

* * * * *